United States Patent
Cho et al.

(10) Patent No.: US 10,012,292 B2
(45) Date of Patent: Jul. 3, 2018

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hywaseong-si (KR); Seong Wook Hwang, Gunpo-si (KR); Hyun Sik Kwon, Seoul (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/280,908

(22) Filed: Sep. 29, 2016

(65) Prior Publication Data
US 2017/0159772 A1    Jun. 8, 2017

(30) Foreign Application Priority Data
Dec. 2, 2015    (KR) .................. 10-2015-0170989

(51) Int. Cl.
    *F16H 3/66*    (2006.01)
(52) U.S. Cl.
    CPC ....... *F16H 3/66* (2013.01); *F16H 2200/0065* (2013.01); *F16H 2200/2012* (2013.01); *F16H 2200/2046* (2013.01); *F16H 2200/2097* (2013.01)
(58) Field of Classification Search
    None
    See application file for complete search history.

(56) References Cited

U.S. PATENT DOCUMENTS

| 7,549,942 B2 * | 6/2009 | Gumpoltsberger ....... F16H 3/66 475/276 |
| 7,575,533 B2 | 8/2009 | Gumpoltsberger |
| 8,444,524 B2 * | 5/2013 | Gumpoltsberger ....... F16H 3/66 475/276 |
| 2015/0141195 A1 | 5/2015 | Beck et al. |

FOREIGN PATENT DOCUMENTS

JP    2015-59619 A    3/2015

* cited by examiner

*Primary Examiner* — Erin D Bishop
(74) *Attorney, Agent, or Firm* — Morgan, Lewis & Bockius LLP

(57) ABSTRACT

A planetary gear train of an automatic transmission for a vehicle may include an input shaft for receiving an engine torque, an output shaft for outputting a shifted torque, a first planetary gear set, a second planetary gear set, a third planetary gear set, a fourth planetary gear set, six control elements, a first connecting member directly connected with a transmission housing, a second connecting member selectively connectable with the transmission housing, a third connecting member selectively connectable with the input shaft, a fourth connecting member directly connected with the input shaft, a fifth connecting member selectively connectable with the transmission housing, a sixth connecting member selectively connectable with the input shaft, and selectively connectable with the transmission housing, a seventh connecting member directly connected with the output shaft, and an eighth connecting member selectively connectable with the input shaft.

9 Claims, 3 Drawing Sheets

FIG. 2

| SPEED STAGE | C1 | C2 | C3 | B1 | B2 | B3 | GEAR RATIO |
|---|---|---|---|---|---|---|---|
| D1 | | | | | ○ | ○ | 5.833 |
| D2 | | | ○ | | | ○ | 3.300 |
| D3 | | | ○ | | ○ | | 2.307 |
| D4 | | | ○ | ○ | | | 1.657 |
| D5 | ○ | | ○ | | | | 1.000 |
| D6 | | ○ | ○ | | | | 0.875 |
| D7 | ○ | ○ | | | | | 0.875 |
| D8 | | ○ | | ○ | | | 0.714 |
| D9 | | ○ | | | ○ | | 0.636 |
| REV | ○ | | | | | ○ | 3.889 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0170989filed Dec. 2, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering stiff competition among auto-makers in enhancing fuel consumption of a vehicle.

Therefore, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, the number of internal components increases as the number of gear shift stages is increased, which may deteriorate installability, production cost, weight and/or power flow efficiency.

Accordingly, development of a planetary gear train which may bring about maximum efficiency with a small number of components is important in order to increase a fuel efficiency enhancement effect through the multiple speed stages.

In this respect, an eight-speed automatic transmission has been recently introduced, and a planetary gear train for an automatic transmission enabling more shift stages is under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of, by minimal complexity, realizing at least forward ninth speeds and at least one reverse speed, increasing a gear ratio span so as to improve power delivery performance and fuel consumption, and achieving driving stability of a vehicle by utilizing a low rotation speed of an engine.

According to various aspects of the present invention, a planetary gear train of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements, at least one control element for selectively interconnecting at least one of the rotation elements and a transmission housing, a first connecting member connected with the first rotation element and directly connected with the transmission housing, a second connecting member connected with the second rotation element and the seventh rotation element, and selectively connectable with the transmission housing to act as a selective fixed element, a third connecting member connected with the third rotation element and the sixth rotation element, and selectively connectable with the input shaft to act as a selective input element, a fourth connecting member connected with the fourth rotation element and directly connected with the input shaft to act as an input element, a fifth connecting member connected with the fifth rotation element and selectively connectable with the transmission housing to act as a selective fixed element, a sixth connecting member connected with the eighth rotation element and the twelfth rotation element, selectively connectable with the input shaft to act as a selective input element, and selectively connectable with the transmission housing to act as a selective fixed element, a seventh connecting member connected with the ninth rotation element and the eleventh rotation element, and directly connected with the output shaft to act as an output element, and an eighth connecting member connected with the tenth rotation element, and selectively connectable with the input shaft to act as a selective input element.

The first planetary gear set may be a single pinion planetary gear set, where the first rotation element may be a first sun gear, the second rotation element may be a first planet carrier, and the third rotation element may be a first ring gear, the second planetary gear set may be a single pinion planetary gear set, where the fourth rotation element may be a second sun gear, the fifth rotation element may be a second planet carrier, and the sixth rotation element may be a second ring gear, the third planetary gear set may be a single pinion planetary gear set, where the seventh rotation element may be a third sun gear, the eighth rotation element may be a third planet carrier, and the ninth rotation element may be a third ring gear, and the fourth planetary gear set may be a single pinion planetary gear set, where the tenth rotation element may be a fourth sun gear, the eleventh rotation element may be a fourth planet carrier, and the twelfth rotation element may be a fourth ring gear.

The six control elements may include a first clutch selectively connecting the input shaft and the third connecting member, a second clutch selectively connecting the input shaft and the sixth connecting member, a third clutch selectively connecting the input shaft and the eighth connecting member, a first brake selectively connecting the second connecting member and the transmission housing, a second brake selectively connecting the fifth connecting member and the transmission housing, and a third brake selectively connecting the sixth connecting member and the transmission housing.

Shift stages realized by selective operation of the two control elements among the six control elements may include a forward first speed formed by operation of the second and third brakes, a forward second speed formed by operation of the third clutch and the third brake, a forward third speed formed by operation of the third clutch and the second brake, a forward fourth speed formed by operation of the third clutch and the first brake, a forward fifth speed formed by operation of the first and third clutches, a forward sixth speed formed by operation of the second and third clutches, a forward seventh speed formed by operation of the first and second clutches, a forward eighth speed formed by operation of the second clutch and first brake, a forward ninth speed formed by operation of the second clutch and second brake, and a reverse speed formed by operation of the first clutch and third brake.

According to various aspects of the present invention, a planetary gear train of an automatic transmission for a vehicle may include an input shaft for receiving an engine torque, an output shaft for outputting a shifted torque, a first planetary gear set as a single pinion planetary gear set including first, second, and third rotation elements, a second planetary gear set as a single pinion planetary gear set including fourth, fifth, and sixth rotation elements, a third planetary gear set as a single pinion planetary gear set including seventh, eighth, and ninth rotation elements, a fourth planetary gear set as a single pinion planetary gear set including tenth, eleventh, and twelfth rotation elements, a first connecting member connected with the first rotation element and directly connected with the transmission housing, a second connecting member connected with the second rotation element and the seventh rotation element, and selectively connectable with the transmission housing, a third connecting member connected with the third rotation element and the sixth rotation element, and selectively connectable with the input shaft, a fourth connecting member connected with the fourth rotation element and directly connected with the input shaft, a fifth connecting member connected with the fifth rotation element and selectively connectable with the transmission housing, a sixth connecting member connected with the eighth rotation element and the twelfth rotation element, and selectively connectable with the input shaft, and selectively connectable with the transmission housing, a seventh connecting member connected with the ninth rotation element and the eleventh rotation element, and directly connected with the output shaft, an eighth connecting member connected with the tenth rotation element, and selectively connectable with the input shaft, a first clutch selectively connecting the input shaft and the third connecting member, a second clutch selectively connecting the input shaft and the sixth connecting member, a third clutch selectively connecting the input shaft and the eighth connecting member, a first brake selectively connecting the second connecting member and the transmission housing, a second brake selectively connecting the fifth connecting member and the transmission housing, and a third brake selectively connecting the sixth connecting member and the transmission housing.

According to various aspects of the present invention, a planetary gear train of an automatic transmission for a vehicle may include an input shaft for receiving an engine torque, an output shaft for outputting a shifted torque, a first planetary gear set as a single pinion planetary gear set including first, second, and third rotation elements, a second planetary gear set as a single pinion planetary gear set including fourth, fifth, and sixth rotation elements, a third planetary gear set as a single pinion planetary gear set including seventh, eighth, and ninth rotation elements, a fourth planetary gear set as a single pinion planetary gear set including tenth, eleventh, and twelfth rotation elements, a first connecting member connected with the first rotation element and directly connected with the transmission housing, a second connecting member connected with the second rotation element and the seventh rotation element, and selectively connectable with the transmission housing, a third connecting member connected with the third rotation element and the sixth rotation element, and may be selectively connectable with the input shaft, a fourth connecting member connected with the fourth rotation element and directly connected with the input shaft, a fifth connecting member connected with the fifth rotation element and selectively connectable with the transmission housing, a sixth connecting member connected with the eighth rotation element and the twelfth rotation element, and selectively connectable with the input shaft, and selectively connectable with the transmission housing, a seventh connecting member connected with the ninth rotation element and the eleventh rotation element, and directly connected with the output shaft, an eighth connecting member connected with the tenth rotation element, and selectively connectable with the input shaft, a first clutch selectively connecting the input shaft and the third connecting member, a second clutch selectively connecting the input shaft and the sixth connecting member, a third clutch selectively connecting the input shaft and the eighth connecting member, a first brake selectively connecting the second connecting member and the transmission housing, a second brake selectively connecting the fifth connecting member and the transmission housing, and a third brake selectively connecting the sixth connecting member and the transmission housing.

According to various aspects of the present invention, a planetary gear train of an automatic transmission for a vehicle may include an input shaft for receiving an engine torque, an output shaft for outputting a shifted torque, a first planetary gear set as a single pinion planetary gear set including a first sun gear, a first planet carrier, and a first ring gear, a second planetary gear set as a single pinion planetary gear set including a second sun gear, a second planet carrier, and second ring gear, a third planetary gear set as a single pinion planetary gear set including a third sun gear, a third planet carrier, and a third ring gear, a fourth planetary gear set as a single pinion planetary gear set including a fourth sun gear, a fourth planet carrier, and a fourth ring gear, a first connecting member connected with the first sun gear and directly connected with the transmission housing, a second connecting member connected with the first planet carrier and the third sun gear, and selectively connectable with the transmission housing, a third connecting member connected with the first ring gear and second ring gear, and may be selectively connectable with the input shaft, a fourth connecting member connected with the second sun gear and directly connected with the input shaft, a fifth connecting member connected with the second planet carrier and selectively connectable with the transmission housing, a sixth connecting member connected with the third planet carrier and the fourth ring gear, and selectively connectable with the input shaft, and selectively connectable with the transmission housing, a seventh connecting member connected with the third ring gear and the fourth planet carrier, and directly connected with the output shaft, an eighth connecting member connected with the fourth sun gear, and selectively connectable with the input shaft, and six control elements, at least one control element for selectively interconnecting at least one of the connecting members and a transmission housing.

According to various aspects of the present invention, a planetary gear train of an automatic transmission for a vehicle may include an input shaft for receiving an engine torque, an output shaft for outputting a shifted torque, a first planetary gear set as a single pinion planetary gear set including a first sun gear, a first planet carrier, and a first ring gear, a second planetary gear set as a single pinion planetary gear set including a second sun gear, a second planet carrier, and second ring gear, a third planetary gear set as a single pinion planetary gear set including a third sun gear, a third planet carrier, and a third ring gear, a fourth planetary gear set as a single pinion planetary gear set including a fourth sun gear, a fourth planet carrier, and a fourth ring gear, a first connecting member connected with the first sun gear and directly connected with the transmission housing, a second connecting member connected with the second planet carrier and the third sun gear, a third connecting member connected with the first ring gear and second ring gear, and selectively connectable with the input shaft, a fourth connecting member connected with the second sun gear and directly connected with the input shaft, a fifth connecting member connected with the second planet carrier and selectively connectable with the transmission housing, a sixth connecting member connected with the third planet carrier and the fourth ring gear, selectively connectable with the input shaft, and selectively connectable with the transmission housing, a seventh connecting member connected with the third ring gear and the fourth planet carrier, and directly connected with the output shaft, an eighth connecting member connected with the fourth sun gear, and selectively connectable with the input shaft, and six control elements for selectively interconnecting the connecting members and a transmission housing.

A planetary gear train according to various embodiment of the present invention may realize at least forward ninth speeds and at least one reverse speed formed by operating the four planetary gear sets as simple planetary gear sets by controlling six control elements.

In addition, a planetary gear train according to various embodiments of the present invention may substantially improve driving stability by realizing shift stages appropriate for rotation speed of an engine due to multi-stages of an automatic transmission.

Furthermore, a planetary gear train according to various embodiments of the present invention may maximize engine driving efficiency through multiple speed-stages of an automatic transmission, and may improve power delivery performance and fuel consumption.

It is understood that the tell ii "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in the planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
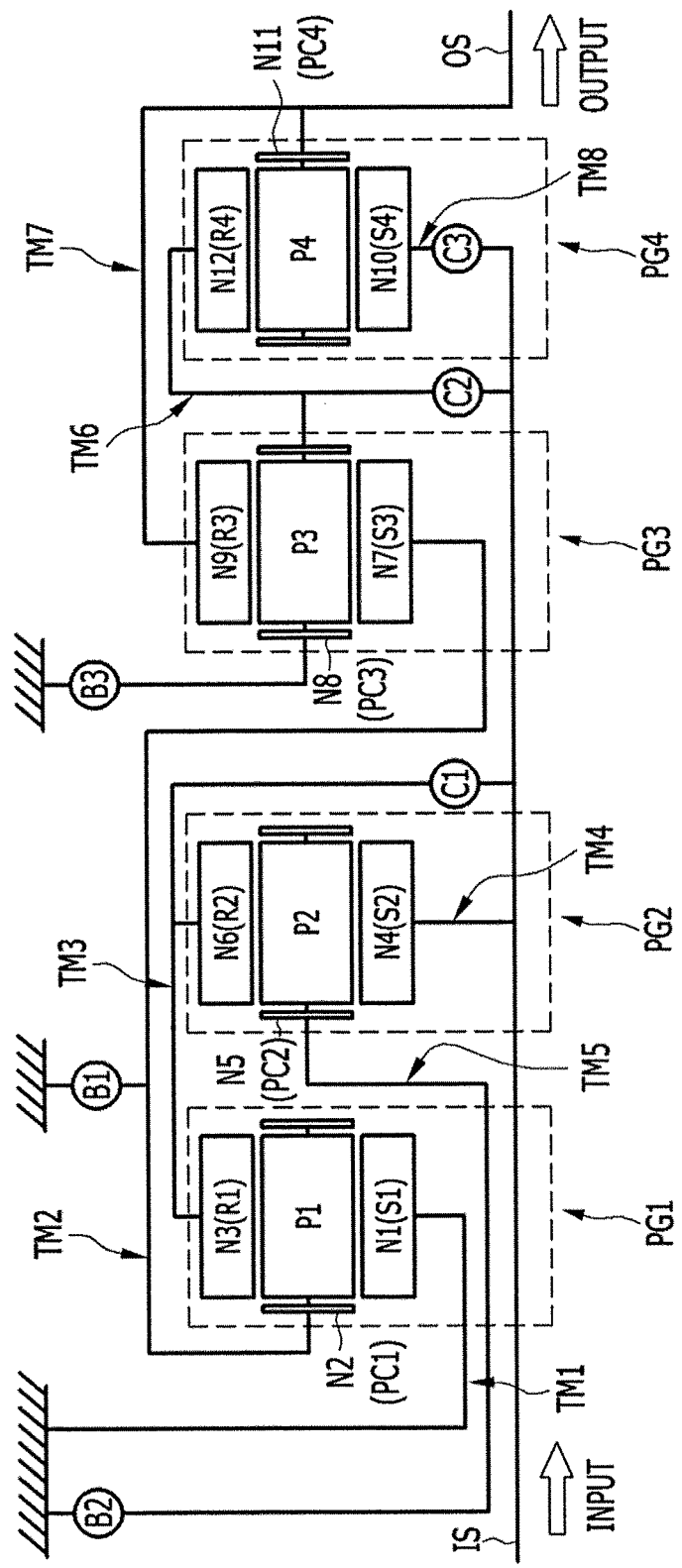
FIG. 1 is a schematic diagram of a planetary gear train according to various embodiments of the present invention.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 arranged on a same axis, an input shaft IS, an output shaft OS, eight connecting members TM1 to TM8 for interconnecting rotation elements of the first, second, third, and fourth planetary gear sets PG1, PG2, PG3, and PG4, six control elements C1 to C2 and B1 to B4, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets are arranged in the order of first, second, third and fourth planetary gear sets PG1, PG2, PG3 and PG4, from an engine side The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinion P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinion P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinion P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotation element N10, the fourth planet carrier PC4 acts as an eleventh rotation element N11, and the fourth ring gear R4 acts as a twelfth rotation element N12.

In the arrangement of the first, second, third, and fourth planetary gear sets PG1, PG2, PG3, and PG4, the second rotation element N2 is directly connected with the seventh rotation element N7 and the third rotation element N3 is directly connected with the sixth rotation element N6, the eighth rotation element N8 is directly connected with the twelfth rotation element N12, and the ninth rotation element N9 is directly connected with the eleventh rotation element N11, by eight connecting members TM1 to TM8.

The eight connecting members TM1 to TM8 are arranged as follows.

The first connecting member TM1 is connected with the first rotation element N1 (first sun gear S1), and is directly connected with the transmission housing H, thereby continuously acting as a fixed element.

The second connecting member TM2 is connected with the second rotation element N2 (first planet carrier PC1) and seventh rotation element N7 (third sun gear S3), and is selectively connectable with the transmission housing H, thereby acting as a selective fixed element.

The third connecting member TM3 is connected with the third rotation element N3 (first ring gear R1) and the sixth rotation element N6 (second ring gear R2), and is selectively connectable with the input shaft IS, thereby acting as a selective input element.

The fourth connecting member TM4 is connected with the fourth rotation element N4 (second sun gear N2), and is directly connected with the input shaft IS, thereby continuously acting as a n input element.

The fifth connecting member TM5 is connected with the fifth rotation element N5 (second planet carrier PC2), and is selectively connectable with the transmission housing H, thereby acting as a selective fixed element.

The sixth connecting member TM6 is connected with the eighth rotation element N8 (third planet carrier PC3) and the twelfth rotation element N12 (fourth ring gear R4), and is selectively connectable with the input shaft IS (fourth input shaft TM4), thereby acting as a selective input element, and is selectively connectable with the transmission housing H, thereby acting as a selective fixed element The seventh connecting member TM7 is connected with the ninth rotation element N9 (third ring gear R3) and the eleventh rotation element N11 (fourth planet carrier PC4), and is directly connected with the output shaft OS, thereby continuously acting as a output element.

The eighth connecting member TM8 is connected with the tenth rotation element N10 (fourth sun gear S4), and is selectively connectable with the input shaft IS (fourth input shaft TM4), thereby acting as a selective input element.

The connecting members TM1 to TM8 may be selectively interconnected with one another by control elements of three clutches C1, C2, and C3.

The connecting members TM1 to TM8 may be selectively connectable with the transmission housing H, by control elements of three brakes B1, B2, and B3.

The six control elements C1 to C3 and B1 to B3 are arranged as follows.

The first clutch C1 is arranged between the input shaft IS and the third connecting member TM3, such that the input shaft IS (fourth connecting member TM4) and the third connecting member TM3 may selectively become integral.

The second clutch C2 is arranged between the input shaft IS (fourth connecting member TM4) and the sixth connecting member TM6, such that the input shaft IS (fourth connecting member TM4) and the sixth connecting member TM6 may selectively become integral.

The third clutch C3 is arranged between the input shaft IS (fourth connecting member TM4) and the eighth connecting member TM8, such that the input shaft IS (fourth connecting member TM4) and the eighth connecting member TM8 may selectively become integral.

The first brake B1 is arranged between the second connecting member TM2 and the transmission housing H, such that the second connecting member TM2 may selectively act as a fixed element.

The second brake B2 is arranged between the fifth connecting member TM5 and the transmission housing H, such that the fifth connecting member TM5 may selectively act as a fixed element.

The third brake B3 is arranged between the sixth connecting member TM6 and the transmission housing H, such that the sixth connecting member TM6 may selectively act as a fixed element.

The control elements of the first, second, and the third clutches C1, C2, and C3 and the first, second, and the third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to various embodiments of the present invention.

As shown in FIG. 2, a planetary gear train according to various embodiments of the present invention performs shifting by operating two control elements at respective shift stages.

In the forward first speed shift stage D1, second, third brake B2 and B3 are operated. As a result, torque of the input shaft IS is input to the fourth connecting member TM4. In addition, the first connecting member TM1 acts as a fixed element, and the fifth and sixth connecting member TM5 and TM6 simultaneously act as fixed elements by the operation of the second and third brakes B2 and B3, thereby realizing the forward first speed and outputting a shifted torque through the output shaft OS connected with the seventh connecting member.

In the forward second speed shift stage D2, the third clutch C3 and the third brake B3 are operated. As a result, the eighth connecting member TM8 is connected with the input shaft IS (fourth connecting member TM4) by the operation of the third clutch C3, torque of the input shaft IS is simultaneously input to the fourth connecting member TM4 and the eighth connecting member TM8. In addition, the first connecting member TM1 acts as a fixed element and the sixth connecting member TM6 simultaneously acts as a fixed element by the operation of the third brake B3, thereby realizing the forward second speed and outputting a shifted torque through the output shaft OS connected with the seventh connecting member TM7 by cooperative operation of the respective connecting member.

In the forward third speed shift stage D3, third clutch C3 and the third clutch C3 are operated. As a result, the eighth connecting member TM8 is connected with the input shaft IS (fourth connecting member TM4) by the operation of third clutch C3, torque of the input shaft IS is simultaneously input to the fourth connecting member TM4 and the eighth connecting member TM8. In addition, the first connecting member TM1 acts as a fixed element and the fifth connecting member TM5 simultaneously acts as a fixed element by the operation of the second brake B2, thereby realizing the forward third speed and outputting a shifted torque through the output shaft OS connected with the seventh connecting member TM7 by cooperative operation of the respective connecting member.

In the forward fourth speed shift stage D4, the third clutch C3 and the first brake B1 are operated. As a result, the eighth connecting member TM8 is connected with the input shaft IS (fourth connecting member TM4) by the operation of the third clutch C3 and torque of the input shaft IS is simultaneously input to fourth connecting member TM4 and the eighth connecting member TM8. In addition, the first connecting member TM1 acts as a fixed element and the second connecting member TM2 simultaneously acts as a fixed element by the operation of the first brake B1, thereby realizing the forward fourth speed and outputting a shifted torque through the output shaft OS connected with the seventh connecting member TM7 by cooperative operation of the respective connecting member.

In the forward fifth speed shift stage D5, the first and third clutches C1 and C3 are operated. As a result, the third connecting member TM3 is connected with the third connecting member TM3 by the operation of the first clutch C1, and the eighth connecting member TM8 is connected with the input shaft IS (fourth connecting member TM4) by the operation of the third clutch C3, torque of the input shaft IS is input to fourth, third, and eighth connecting member TM4, TM3, and TM8

In addition, the first connecting member TM1 acts as a fixed element, thereby realizing the forward fifth speed and outputting a shifted torque through the output shaft OS connected with the seventh connecting member TM7 by cooperative operation of the respective connecting member.

In the forward sixth speed shift stage D6, the second and third clutches C2 and C3 are operated. As a result, the sixth connecting member TM6 is connected with the input shaft IS (fourth connecting member TM4) by the operation of the second clutch C2 and eighth connecting member TM8 is connected with the input shaft IS (fourth connecting member TM4) by the operation of the third clutch C3, torque of the input shaft IS is input to fourth, sixth, and eighth connecting member TM4, TM6, and TM8

Then, the first connecting member TM1 acts as a fixed element, thereby realizing the forward sixth speed and outputting a inputted torque through the output shaft OS connected with the seventh connecting member TM7 by the fourth planetary gear set PG4.

In the forward seventh speed shift stage D7, the first and second clutches C1 and C2 are operated. As a result, the third connecting member TM3 is connected with input shaft IS (fourth connecting member TM4) by the operation of the first clutch C1 and the sixth connecting member TM6 is connected with the input shaft IS (fourth connecting member TM4) by the operation of the second clutch C2, torque of the input shaft IS is input to the fourth, third, and sixth connecting members TM4, TM3, and TM6. In addition, the first connecting member TM1 acts as a fixed element, thereby realizing the forward seventh speed and outputting a input-ted torque through the output shaft OS connected with the seventh connecting member TM7.

In the forward eighth speed shift stage D8, the second clutch C2 and the first brake B1 are operated. As a result, the sixth connecting member TM6 is connected with the input shaft IS (fourth connecting member TM4) by operation of the second clutch C2 and torque of the input shaft IS is input to fourth connecting member TM4 and the sixth connecting member TM6. And the first connecting member TM1 acts as a fixed element and the second connecting member TM2 simultaneously acts as a fixed element by the operation of the first brake B1, thereby realizing the forward eighth speed and outputting an inputted torque through the output shaft OS connected with the seventh connecting member TM7.

In the forward ninth speed shift stage D9, second clutch C2 and second brake B2 are operated As a result, the sixth connecting member TM6 is connected with the input shaft IS (fourth connecting member TM4) by the operation of the second clutch C2 and torque of the input shaft IS is input to fourth connecting member TM4 and the sixth connecting member TM6. And the first connecting member TM1 acts as a fixed element and the fifth connecting member TM5 simultaneously acts as a fixed element by the operation of the second brake B2, thereby realizing the forward ninth speed and outputting a inputted torque through the output shaft OS connected with the seventh connecting member TM7.

In the reverse speed REV, the first clutch C1 and the third brake B3 are operated. As a result, the third connecting member TM3 is connected with the input shaft IS (fourth connecting member TM4) by the operation of the first clutch C1, torque of the input shaft IS is input to the fourth connecting member TM4 and the third connecting member TM3. In addition, the first connecting member TM1 acts as a fixed element and the connecting member TM6 simultaneously acts as a fixed element by the operation of the third brake B3, thereby realizing the reverse speed and outputting a shifted torque through the output shaft OS connected with the seventh connecting member TM7 by cooperative operation of the respective connecting member.

As described above, a planetary gear train according to various embodiments of the present invention may realize forward nine speeds and one reverse speed formed by operating the four planetary gear sets PG1, PG2, PG3, and PG4 by controlling the three clutches C1, C2, and C3 and the three brakes B1, B2, and B3.

In addition, a planetary gear train according to various embodiments of the present invention may substantially improve driving stability by realizing shift stages appropriate for rotation speed of an engine due to multi-stages of an automatic transmission.

In addition, a planetary gear train according to various embodiments of the present invention may maximize engine driving efficiency by multi-stages of an automatic transmission, and may improve power delivery performance and fuel consumption.

Figure 3:
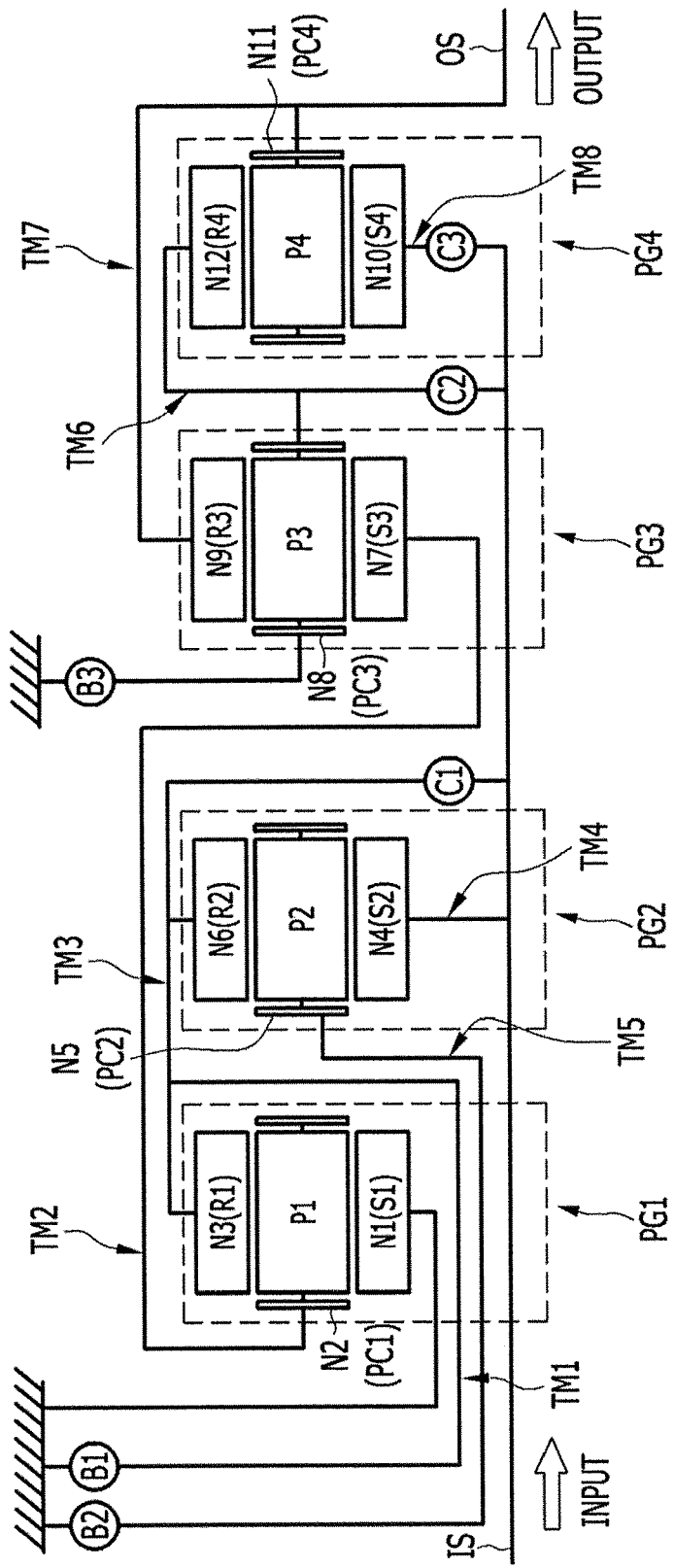
FIG. 3 is a schematic diagram of a planetary gear train according to various embodiments of the present invention.

FIG. 3 is a schematic diagram of a planetary gear train according to various embodiments of the present invention.

Referring to FIG. 3, according to various embodiments of the planetary gear train, the first brake B1 is arranged between the third connecting member TM3 and the transmission housing H contrary to the various embodiments of FIG. 1, in which the first brake B1 is arranged between the second connecting member TM2 and the transmission housing H.

As a result, at the forward fourth speed and the forward eighth speed in which the first brake B1 is operated, the third connecting member TM3 acts as a fixed element contrary to the various embodiments of FIG. 1, in which the second connecting member TM2 acts as a fixed element.

In addition, detailed description of the other control elements at respective shift stages, as shown in FIG. 2, will be omitted because the elements act as the various embodiments of FIG. 1.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft for receiving an engine torque;
    an output shaft for outputting a shifted torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    six control elements, each of which selectively connects at least one of the first, second, third, fourth, fifth, sixth, seventh, eighth, ninth, tenth, eleventh, and twelfth rotation elements with the input shaft or selectively connects at least one of the first, second, third, fourth, fifth, sixth, seventh, eighth, ninth, tenth, eleventh, and twelfth rotation elements with a transmission housing;
    a first connecting member fixedly connected with the first rotation element and fixedly connected with the transmission housing;
    a second connecting member fixedly connected with the second rotation element and the seventh rotation element and selectively connectable with the transmission housing to act as a selective fixed element;
    a third connecting member fixedly connected with the third rotation element and the sixth rotation element, and selectively connectable with the input shaft to act as a selective input element;
    a fourth connecting member fixedly connected with the fourth rotation element and fixedly and continuously connected with the input shaft to act as an input element;
    a fifth connecting member fixedly connected with the fifth rotation element and selectively connectable with the transmission housing to act as a selective fixed element;
    a sixth connecting member fixedly and continuously connected with the eighth rotation element and the twelfth rotation element, selectively connectable with the input shaft to act as a selective input element, and selectively connectable with the transmission housing to act as a selective fixed element;
    a seventh connecting member fixedly connected with the ninth rotation element and the eleventh rotation element, and fixedly connected with the output shaft to act as an output element; and
    an eighth connecting member fixedly connected with the tenth rotation element, and selectively connectable with the input shaft to act as a selective input element.

2. The planetary gear train of claim 1, wherein the six control elements comprise:
    a first clutch selectively connecting the input shaft and the third connecting member;
    a second clutch selectively connecting the input shaft and the sixth connecting member;
    a third clutch selectively connecting the input shaft and the eighth connecting member;
    a first brake selectively connecting the second connecting member and the transmission housing;
    a second brake selectively connecting the fifth connecting member and the transmission housing; and
    a third brake selectively connecting the sixth connecting member and the transmission housing.

3. The planetary gear train of claim 2, wherein shift stages realized by selective operation of two control elements among the six control elements comprise:
    a forward first speed formed by operation of the second and third brakes;
    a forward second speed formed by operation of the third clutch and the third brake;
    a forward third speed formed by operation of the third clutch and the second brake;
    a forward fourth speed formed by operation of the third clutch and the first brake;
    a forward fifth speed formed by operation of the first and third clutches;
    a forward sixth speed formed by operation of the second and third clutches;
    a forward seventh speed formed by operation of the first and second clutches;
    a forward eighth speed formed by operation of the second clutch and first brake;
    a forward ninth speed formed by operation of the second clutch and second brake; and
    a reverse speed formed by operation of the first clutch and third brake.

4. A planetary gear train of an automatic transmission for a vehicle, comprising:
    an input shaft for receiving an engine torque;
    an output shaft for outputting a shifted torque;
    a first planetary gear set as a single pinion planetary gear set including a first rotation element, a second rotation element, and a third rotation element;
    a second planetary gear set as a single pinion planetary gear set including a fourth rotation element, a fifth rotation element, and a sixth rotation element;
    a third planetary gear set as a single pinion planetary gear set including a seventh rotation element, an eighth rotation element, and a ninth rotation element;

a fourth planetary gear set as a single pinion planetary gear set including a tenth rotation element, an eleventh rotation element, and a twelfth rotation element;

a first connecting member fixedly connected with the first rotation element and fixedly connected with the transmission housing;

a second connecting member fixedly connected with the second rotation element and the seventh rotation element, and selectively connectable with the transmission housing;

a third connecting member fixedly connected with the third rotation element and the sixth rotation element, and selectively connectable with the input shaft;

a fourth connecting member fixedly connected with the fourth rotation element and fixedly connected with the input shaft;

a fifth connecting member fixedly connected with the fifth rotation element and selectively connectable with the transmission housing;

a sixth connecting member fixedly connected with the eighth rotation element and the twelfth rotation element, and selectively connectable with the input shaft, and selectively connectable with the transmission housing;

a seventh connecting member fixedly connected with the ninth rotation element and the eleventh rotation element, and fixedly connected with the output shaft;

an eighth connecting member fixedly connected with the tenth rotation element, and selectively connectable with the input shaft;

a first clutch selectively connecting the input shaft and the third connecting member;

a second clutch selectively connecting the input shaft and the sixth connecting member;

a third clutch selectively connecting the input shaft and the eighth connecting member;

a first brake selectively connecting the second connecting member and the transmission housing;

a second brake selectively connecting the fifth connecting member and the transmission housing; and a third brake selectively connecting the sixth connecting member and the transmission housing.

5. The planetary gear train of claim 4, wherein the first planetary gear set is a single pinion planetary gear set, where the first rotation element is a first sun gear, the second rotation element is a first planet carrier, and the third rotation element is a first ring gear;

the second planetary gear set is a single pinion planetary gear set, where the fourth rotation element is a second sun gear, the fifth rotation element is a second planet carrier, and the sixth rotation element is a second ring gear;

the third planetary gear set is a single pinion planetary gear set, where the seventh rotation element is a third sun gear, the eighth rotation element is a third planet carrier, and the ninth rotation element is a third ring gear; and the fourth planetary gear set is a single pinion planetary gear set, where the tenth rotation element is a fourth sun gear, the eleventh rotation element is a fourth planet carrier, and the twelfth rotation element is a fourth ring gear.

6. The planetary gear train of claim 4, wherein shift stages realized by selective operation of two control elements among the three clutches and the three brakes comprise:

a forward first speed formed by operation of the second and third brakes;

a forward second speed formed by operation of the third clutch and the third brake;

a forward third speed formed by operation of the third clutch and the second brake;

a forward fourth speed formed by operation of the third clutch and the first brake;

a forward fifth speed formed by operation of the first and third clutches;

a forward sixth speed formed by operation of the second and third clutches;

a forward seventh speed formed by operation of the first and second clutches;

a forward eighth speed formed by operation of the second clutch and first brake;

a forward ninth speed formed by operation of the second clutch and second brake; and a reverse speed formed by operation of the first clutch and third brake.

7. A planetary gear train of an automatic transmission for a vehicle, comprising:

an input shaft for receiving an engine torque;

an output shaft for outputting a shifted torque;

a first planetary gear set as a single pinion planetary gear set including a first sun gear, a first planet carrier, and a first ring gear;

a second planetary gear set as a single pinion planetary gear set including a second sun gear, a second planet carrier, and second ring gear;

a third planetary gear set as a single pinion planetary gear set including a third sun gear, a third planet carrier, and a third ring gear;

a fourth planetary gear set as a single pinion planetary gear set including a fourth sun gear, a fourth planet carrier, and a fourth ring gear, a first connecting member fixedly connected with the first sun gear and fixedly connected with a transmission housing;

a second connecting member fixedly connected with the first planet carrier and the third sun gear;

a third connecting member fixedly connected with the first ring gear and second ring gear, and selectively connectable with the input shaft;

a fourth connecting member fixedly connected with the second sun gear and fixedly connected with the input shaft;

a fifth connecting member fixedly connected with the second planet carrier and selectively connectable with the transmission housing;

a sixth connecting member fixedly connected with the third planet carrier and the fourth ring gear, and selectively connectable with the input shaft, and selectively connectable with the transmission housing;

a seventh connecting member fixedly connected with the third ring gear and the fourth planet carrier, and fixedly connected with the output shaft;

an eighth connecting member fixedly connected with the fourth sun gear, and selectively connectable with the input shaft; and six control elements, each of which selectively connects at least one of the first, second, third, fourth, fifth, sixth, seventh and eighth connecting members with the input shaft or selectively connects at least one of the first, second, third, fourth, fifth, sixth, seventh and eighth connecting members with the transmission housing.

8. The planetary gear train of claim 7, wherein the six control elements comprise:

a first clutch selectively connecting the input shaft and the third connecting member;
a second clutch selectively connecting the input shaft and the sixth connecting member;
a third clutch selectively connecting the input shaft and the eighth connecting member;
a first brake selectively connecting the second connecting member and the transmission housing;
a second brake selectively connecting the fifth connecting member and the transmission housing; and
a third brake selectively connecting the sixth connecting member and the transmission housing.

9. The planetary gear train of claim 8, wherein shift stages realized by selective operation of the two control elements among the six control elements comprise:
 a forward first speed formed by operation of the second and third brakes;
 a forward second speed formed by operation of the third clutch and the third brake;
 a forward third speed formed by operation of the third clutch and the second brake;
 a forward fourth speed formed by operation of the third clutch and the first brake;
 a forward fifth speed formed by operation of the first and third clutches;
 a forward sixth speed formed by operation of the second and third clutches;
 a forward seventh speed formed by operation of the first and second clutches;
 a forward eighth speed formed by operation of the second clutch and first brake;
 a forward ninth speed formed by operation of the second clutch and second brake; and
 a reverse speed formed by operation of the first clutch and third brake.

* * * * *